(12) United States Patent
Carpenter et al.

(10) Patent No.: US 12,249,753 B2
(45) Date of Patent: Mar. 11, 2025

(54) OSPREY MIGRATORY 7-BAND LTE AND ISM ANTENNA

(71) Applicant: Honeywell International Inc., Charlotte, NC (US)

(72) Inventors: Kerrance Lynn Carpenter, Wake Forest, NC (US); Thomas Owen McBride, Four Oaks, NC (US)

(73) Assignee: Honeywell International Inc., Charlotte, NC (US)

( * ) Notice: Subject to any disclaimer, the term of this patent is extended or adjusted under 35 U.S.C. 154(b) by 279 days.

(21) Appl. No.: 17/655,004

(22) Filed: Mar. 16, 2022

(65) Prior Publication Data

US 2023/0299459 A1  Sep. 21, 2023

(51) Int. Cl.
*H01Q 1/22* (2006.01)
*G01D 4/00* (2006.01)
*G08C 17/02* (2006.01)
*H04Q 9/00* (2006.01)

(52) U.S. Cl.
CPC ........... *H01Q 1/2233* (2013.01); *G01D 4/004* (2013.01); *G08C 17/02* (2013.01); *H04Q 9/00* (2013.01)

(58) Field of Classification Search
None
See application file for complete search history.

(56) References Cited

U.S. PATENT DOCUMENTS

| | | |
|---|---|---|
| 8,081,115 B2 | 12/2011 | Crouch et al. |
| 8,749,438 B2 | 6/2014 | Jenwantanavet et al. |
| 2010/0238068 A1* | 9/2010 | Seidel ................ H01Q 19/062 342/175 |
| 2011/0186980 A1* | 8/2011 | Lin ..................... H01Q 1/2283 235/492 |
| 2013/0036834 A1* | 2/2013 | Abdul-Hadi ......... G01F 15/063 73/861.78 |
| 2014/0144994 A1* | 5/2014 | Conner ............. G06K 19/0723 235/492 |
| 2017/0245066 A1* | 8/2017 | Nikles .................... H04R 25/60 |
| 2021/0076319 A1* | 3/2021 | Yoshikawa ........... H04W 40/02 |
| 2021/0153166 A1* | 5/2021 | Kamat .................. H04W 8/183 |
| 2021/0211846 A1* | 7/2021 | Lisewski ............... H04W 4/02 |
| 2021/0305689 A1* | 9/2021 | Leizerovich .......... H05B 47/19 |
| 2021/0399425 A1* | 12/2021 | Ying ..................... G01S 5/0221 |

(Continued)

FOREIGN PATENT DOCUMENTS

| | | |
|---|---|---|
| EP | 2223789 A2 | 9/2010 |
| TW | I552441 B | 10/2016 |

OTHER PUBLICATIONS

A. Dierck, H. Rogier and F. Declercq, "A Wearable Active Antenna for Global Positioning System and Satellite Phone," In IEEE Transactions on Antennas and Propagation, vol. 61, No. 2, pp. 532-538, Feb. 2013 (7 pages total).

*Primary Examiner* — Wilson Lee
(74) *Attorney, Agent, or Firm* — John Maldjian, Esq.; Stevens & Lee PC

(57) ABSTRACT

A system includes a first substrate layer configured at an initial position. A copper foil is positioned above the first substrate layer. A second substrate layer is configured above the copper foil. The second substrate combined with the copper foil and first substrate layer is configured to be curved/bent into one or more shapes. Antenna elements are composed of the copper foil. A coaxial cable is connected to the copper foil.

20 Claims, 4 Drawing Sheets

(56) References Cited

U.S. PATENT DOCUMENTS

2022/0131417 A1\* 4/2022 Yun .................. H02J 50/12
2022/0336959 A1\* 10/2022 Chen ................ H01Q 9/42
2023/0014894 A1\* 1/2023 M M .................. H04W 8/186

\* cited by examiner

OSPREY MIGRATORY 7-BAND LTE AND ISM ANTENNA

TECHNICAL FIELD

The present disclosure generally relates to an antenna with a flexible shape to fit into a variety of products and maintain performance in all frequency bands.

BACKGROUND

Currently, gas and water meters are densely distributed all over North America. Radio connectively to many different frequency bands depending on the network provider and geography is required.

Typically, a total of eight frequency bands must be supported to ensure wireless connectivity everywhere is available. The eight frequency bands must be supported when an antenna is positioned in a gas meter.

Radios can exist that cover all of the eight frequency bands that exist. Current antennas do not fit into the different type of gas meters whether the gas meters are commercial gas meters, residential gas meters, or remote adapters.

The limitation of the antenna that cannot maintain tunability in all eight frequency bands, or fit into all of the current types of gas meters is a limitation of current antennas. The current antennas have limited ability to fit into various gas meters and maintain tunability in all frequency bands.

As such, a need exists for an antenna that can be uniformly used in all types of gas meters.

Further, a need exists for an antenna in all of the frequency bands when it is positioned in different gas meters.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a system includes a first substrate layer configured at an initial position. The system also includes a copper foil positioned above the first substrate layer. Further, the system includes a second substrate layer configured above the copper foil. The second substrate is combined with the copper foil and the first substrate layer to be curved/bent into one or more shapes. Antenna elements are composed of the copper foil.

A plurality of ferrite cores are attached to the coaxial cable.

The combined first substrate layer, copper foil, and second substrate layer maintains tunability in at least eight frequency bands.

The combined first substrate layer, copper foil, and second substrate layer is positioned within a remote meter adapter.

In another embodiment, a system includes a plurality of substrate layers configured at an initial position. The system also includes a copper foil positioned between the substrate layers. The copper foil combined with the substrate layers is configured to bend/curve into one or more various shapes. The combined substrate layers and copper foil are configured to fit into at least one of a residential gas meter, commercial gas meter, or remote meter adapter. The system also includes copper foil antenna elements positioned on the combined substrate layers to ensure tunability in a plurality of frequency bands.

The antenna elements enable the tunability in at least eight frequency bands.

The combined substrate layers and combined foil are curved to be positioned in a Rockwell gas meter.

The antenna elements maintain tunability in a private LTE Band 8 while the substrate layers and copper foil are bent or curved.

In an embodiment, a method configuring a first substrate layer at an initial position. The method also includes positioning a copper foil above the first substrate layer. The method further includes configuring a second substrate layer configured above the copper foil. The second substrate layer is combined with the copper foil and first substrate layer to be curved/bent into one or more shapes. The method also includes shaping the copper foil to form antenna elements. The method further includes positioning a coaxial cable to be connected to the copper foil.

The method includes re-positioning the combined first substrate layer, copper foil, and second substrate layer from a remote meter adapter to a commercial gas meter.

The method also includes reshaping the combined first substrate layer, copper foil, and second substrate layer from a commercial gas meter to a residential gas meter.

The method also includes curving the combined first substrate layer, copper foil, and second substrate layer to fit into a plurality of residential gas meters at various intervals.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Figure 1:
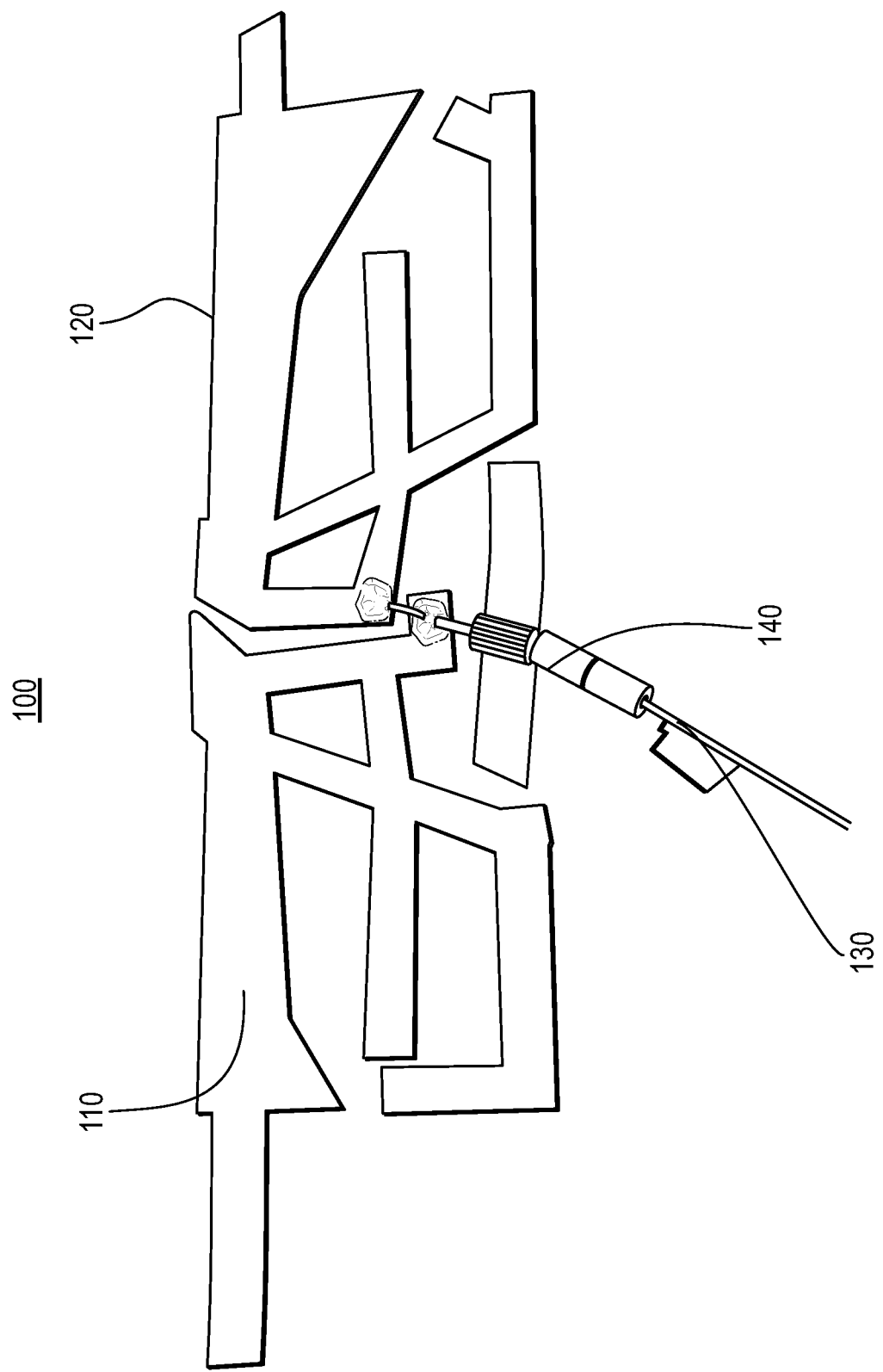
FIG. 1 illustrates a prototype in accordance with an embodiment of the invention.

Unless otherwise indicated, illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc.* v. *H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . ."

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

INTRODUCTION

Embodiments of the present invention include an Osprey antenna that is made of a first substrate layer, a copper foil shaped to form antenna elements, and a second substrate layer. The first and second substrate layer are made of flexible material such as Polyimide ("Kapton") to enable the combined layers including the copper foil to be able to bend/curve to fit into various gas meters that are residential and commercial. The combined substrate layers and copper foil can also be curved or bent to fit into a remote adapter. The combined substrate layers and copper foil make up the Osprey antenna.

The residential gas meters that the Osprey antenna can fit into include an AC250, Sprague, and Rockwell residential gas meter. The commercial gas meters that the Osprey antenna can fit into include an AMCO and Rockwell commercial gas meter. The Osprey antenna can also fit into a remote meter adapter.

The antenna elements are composed of the copper foil. The copper foil enables the Osprey antenna to maintain tunability in at least eight frequency bands. The eight frequency bands include Cat-M primary bands 12, 13, Cat-M secondary bands 5, 4, 2, 8, 26, and an ISM Radio band 902-928 MHz.

The Osprey antenna can be positioned into one of the residential gas meters. The Osprey antenna can then be curved or bent and repositioned into one of the commercial gas meters. As the Osprey antenna is bent or curved, the Osprey antenna maintains tunability in all eight frequency bands. Further, when the Osprey antenna is repositioned in a remote meter adapter, the Osprey antenna still maintains tunability in all eight frequency bands.

System Structure

FIG. 1 illustrates a system 100 of an embodiment of the invention. The system 100 includes a substrate layers 110 and copper foil 120 configured between the substrate layers 110. In addition, a coaxial cable 130 is also shown. Attached to the coaxial cable 130 are three ferrite cores 140.

In FIG. 1, the substrate layers 110 have the copper foil that 120 that is sandwiched or positioned between the substrate layers. One substrate layer 110 is underneath the copper foil 120, while another substrate layer 110 is positioned above the copper foil 120. The substrate layers 110 and the copper foil 120 have the ability of fitting into a variety of different gas meters. The combined substrate layers 110 are flexible with the ability to bend and curve into a variety of shapes. The various products that the substrate layers 110 and copper foil 120 can fit into include residential gas meters. The residential gas meters include an AC250, Sprague, and a Rockwell gas meter. The combined substrate layers 110 and copper foil 120 can also fit into commercial gas meters, wherein the commercial gas meters include an AMCO and Rockwell gas meter. Further, the substrate layers 110 and copper foil 120 can be shaped to fit into a remote meter adapter. The combined substrate layers 110 and copper foil 120 form a flexible antenna that can be curved to fit into any of the residential or commercial gas meters, or a remote meter adapter.

Referring to FIG. 1, the copper foil 120 positioned between the two substrate layers 110 is composed of antenna elements. As such, the antenna elements on the copper foil 120 allow the combined substrate layers 110 with the copper foil 120 to function as an antenna, or Osprey antenna.

Further, the copper foil 120 with the antenna elements enables for tunability in at least eight frequency bands. Moreover, the eight frequency bands include, but are not limited to, Cat-M Primary Bands 12 and 13, Cat-M Secondary Bands 5, 4, 2, 8 and 26, and an ISM Radio Band 902-928 Mhz. Accordingly, whether the substrate layers 110 and copper foil 120 are positioned in a remote meter adapter, and then re-positioned into a residential gas meter, the substrate layers 110 and copper foil 120 will still maintain tunability in all eight frequency bands mentioned above. In another instance, when the substrate layers 110 and copper foil 120 are within a commercial gas meter such as a Rockwell, the substrate layers 110 and copper foil 120 are flexible to where they can be curved as needed to fit into the remote adapter. Despite being curved or bent, the combined substrate layers 110 and copper foil 120 still maintain tunability in all eight frequency bands even though they are re-positioned from a commercial gas meter to a remote meter adapter. The changed or adapted shapes of the substrate layers 110 and copper foil 120 do not adversely affect the tunability of the entire antenna.

In FIG. 1, in summary, the flexible substrate layers 110, made of Kapton, enable the combined substrate layers 110 with the copper foil 120 to fit into any one of the commercial gas meters, residential gas meters, and the remote adapter mentioned above. Further, the antenna elements are composed of the copper foil 120. As a result, the combined substrate layers 110 and copper foil 120 consist of an antenna that maintains tunability in at least eight frequency bands that include Cat-M Primary Bands 12, 13, Cat-M Secondary Bands 5, 4, 2, 8 and 26, and ISM Radio band 902-928 MHz.

Figure 2:
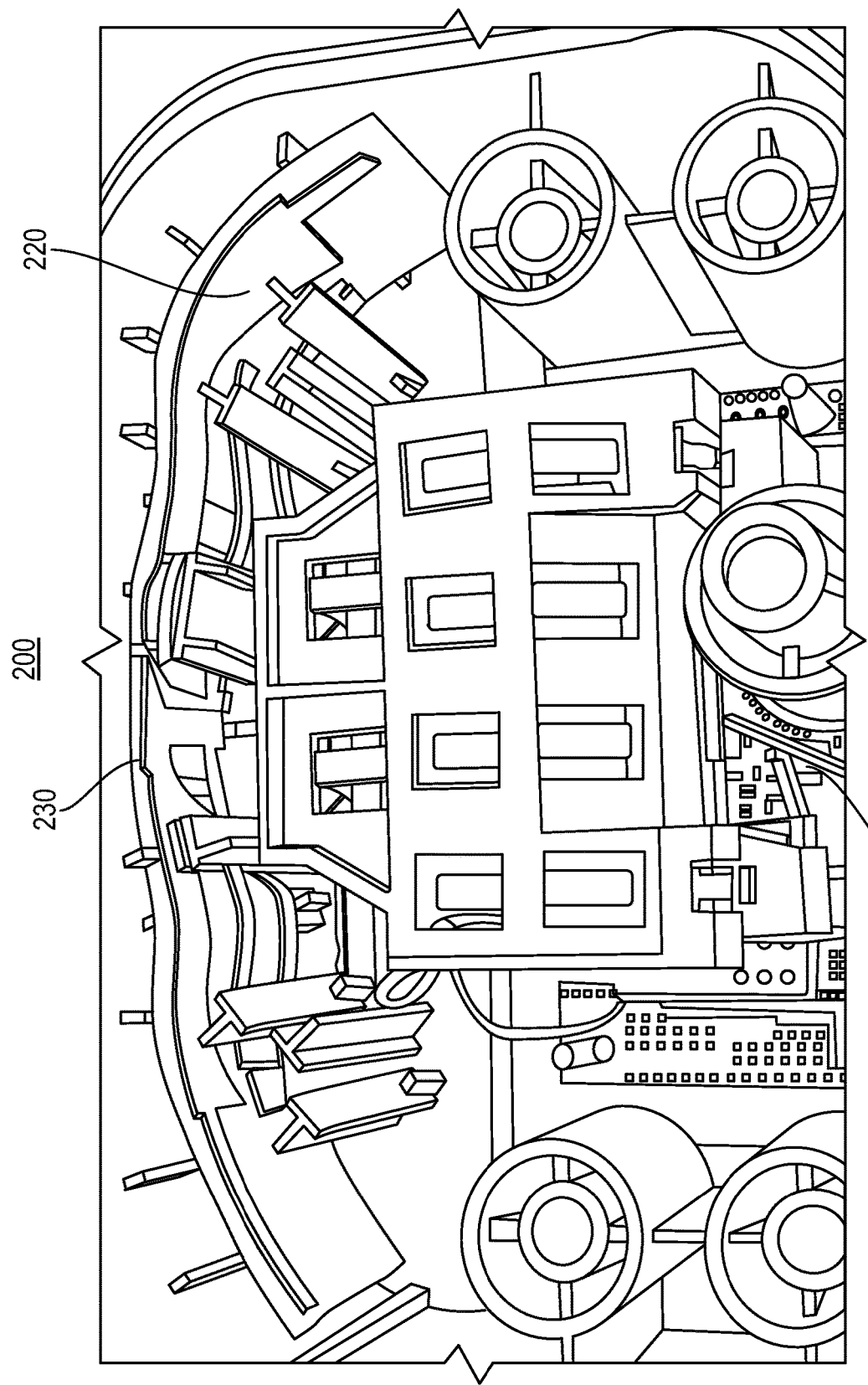
FIG. 2 illustrates the prototype mounted within a gas meter, in accordance with an embodiment of the invention.

Referring to FIG. 2, a system 200 is illustrated that includes a gas meter 210. The gas meter 210 can be a residential meter such as a AC250, Sprague, and Rockwell gas meter. The gas meter 210 can also be a commercial gas meter such as an AMCO or Rockwell. Further, the gas meter 210 can be a remote meter adapter. Within the gas meter 210, a flexible antenna can be configured. The flexible antenna can be can be made up of substrate layers 220 and a copper foil 230 positioned between the substrate layers 220.

In FIG. 2, the substrate layers 220 are made of flexible material such as Kapton. The copper foil 230 includes antenna elements, wherein the antenna elements are effectively composed of the copper foil 230. As such, antenna elements are positioned between the flexible substrate layers 220. The substrate layers 220 and copper foil 230 form the Osprey antenna. The combined substrate layers 220 and copper foil 230 containing the antenna elements can be curved, bent, or shaped as necessary to fit into the gas meter 210. As such, the substrate layers 220 with the copper foil 230 effectively function as an Osprey antenna. Moreover, if it is required to move the combined substrate layers 220 and copper foil 230 or antenna into another gas meter such as another commercial gas meter, residential meter, and remote meter adapter, the Osprey antenna can be bent or curved as necessary to fit into the new gas meter or remote meter adapter. The material in which the substrate layers 220 are made of, such as Kapton, allows the combined substrate layers 220 and copper foil 230 to be able to fit into any of the standard commercial gas meters, residential meters or remote meter adapters.

With respect to FIG. 2, the copper foil 230 that makes up the antenna elements allow the combined substrate layers 220 with the copper foil 230 to form an antenna that can maintain tunability in at least eight frequency bands. The eight frequency bands will at least include Cat-M Primary Bands 12, 13, Cat-M Secondary Bands 5, 4, 2, 8 and 26, and the ISM Radio band 902-928 MHz. The combined substrate layers 220 and copper foil 230 can be curved or shaped into fit into the gas meter 210, and any of the residential or commercial gas meters mentioned above. When the combined substrate layers 220 and copper foil 230 are reshaped or curved, they maintain tunability in all eight of the frequency bands. As such, when the overall antenna is reshaped or curved or bent, the antenna still maintains tunability in all eight frequency bands. As a result, there is an antenna that can fit into all of the different remote meter adapters, commercial gas meters, and residential gas meters. In addition, there is an antenna that will maintain tunability in all eight frequency bands.

Referring to FIG. 2, in summary, an Osprey antenna made up of substrate layers 220 and copper foil 230 is configured to bend or curve into the gas meter 210. In addition, if the need arises for the antenna to be placed another gas meter such as another commercial gas meter, or residential meter, or a remote meter adapter, the antenna can be curved or bent as needed to fit into the commercial gas meter, residential gas meter, and remote adapter. Further, the copper foil 230 consisting of the antenna elements enables the Osprey antenna to maintain tunability in all eight frequency bands.

Figure 3:
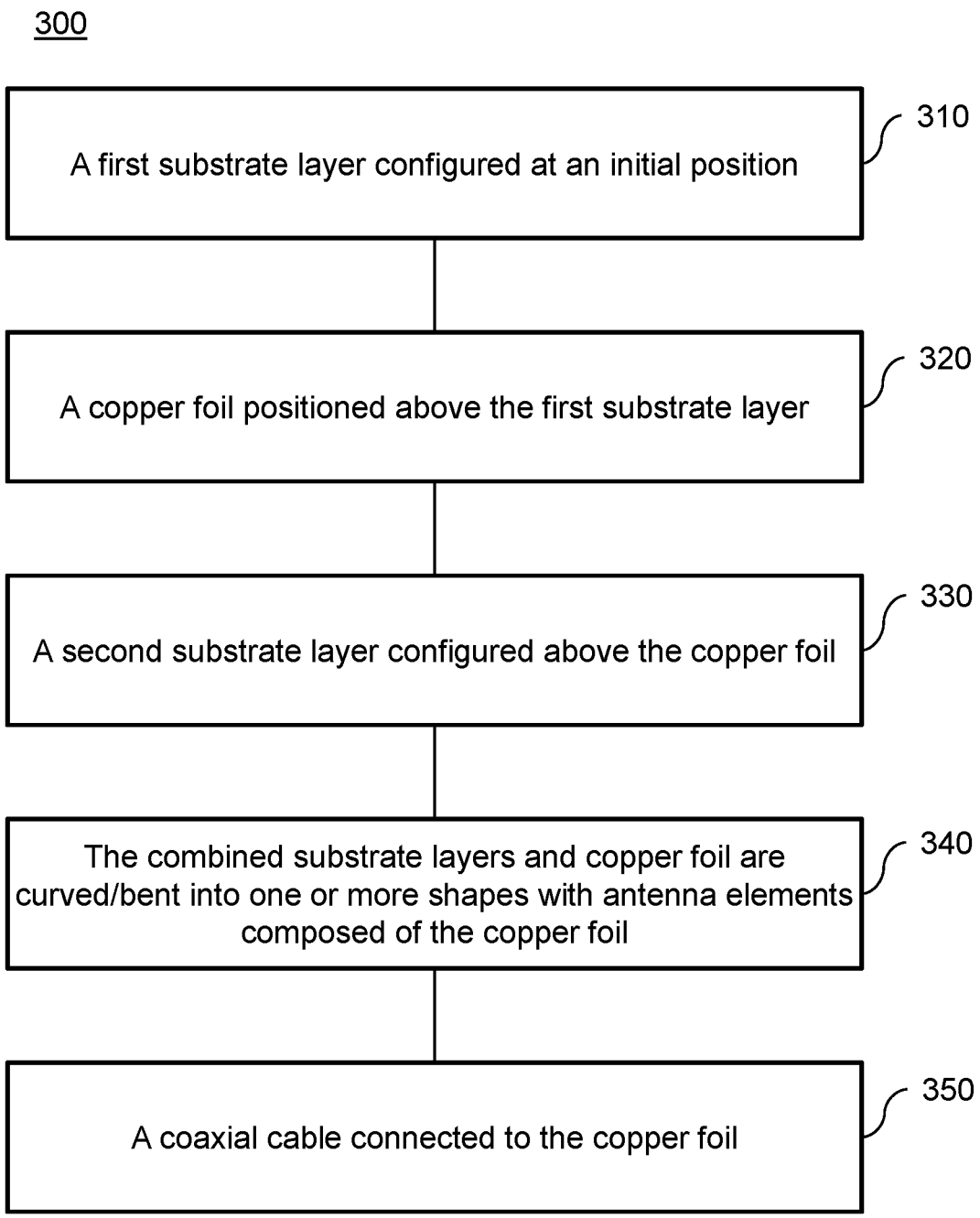
FIG. 3 illustrates a flow chart in accordance with an embodiment of the invention.

Referring to FIG. 3, a process 300 involving an Osprey antenna is described. The process 300 illustrates how the Osprey antenna is configured. Each of the components or layers of the Osprey antenna enable the antenna to change shape and fit in six or more different gas meters. In addition, the Osprey antenna is able to maintain tunability in at least eight frequency bands.

In FIG. 3, at step 310, a first substrate layer is positioned at a first position. The first substrate layer is made of flexible material such as Kapton to enable the first substrate layer to be curved and bent to fit into different gas meters. The different gas meters can be various residential gas meters, commercial gas meters, and a remote meter adapter.

In FIG. 3, at step 320, a copper foil is positioned on the first substrate layer. The copper foil consists of antenna elements. The antenna elements enable the fully configured Osprey antenna to maintain tunability in all eight frequency bands. The eight frequency bands can include Cat-M Primary Bands 12, 13, Cat-M Secondary Bands 5, 4, 2, 8 and 26, and an ISM Radio Band 902-928 Mhz.

Referring to FIG. 3, at step 330, a second substrate layer is configured over the copper foil. The second substrate layer is also made up of the flexible material or Kapton as the first substrate layer. Combined with the first substrate layer, copper foil antenna elements and second substrate layer will form an antenna that can fit into any of the commercial gas meters, residential gas meters, and the remote meter adapter.

In FIG. 3, at step 340, the combined substrate layers and copper foil form an antenna. The layers of the antenna are curved/bent into one or more shapes. As mentioned above, the antenna elements are composed of the copper foil positioned between the first and second substrate layer. The antenna can be curved and bent to fit into a variety of commercial gas meters, residential gas meters, and a remote meter adapter Referring to FIG. 3, at step 350, a coaxial cable is connected to the copper foil. The coaxial cable is soldered to points on the copper foil. Three ferrite cores are attached to the coaxial cable.

Figure 4:
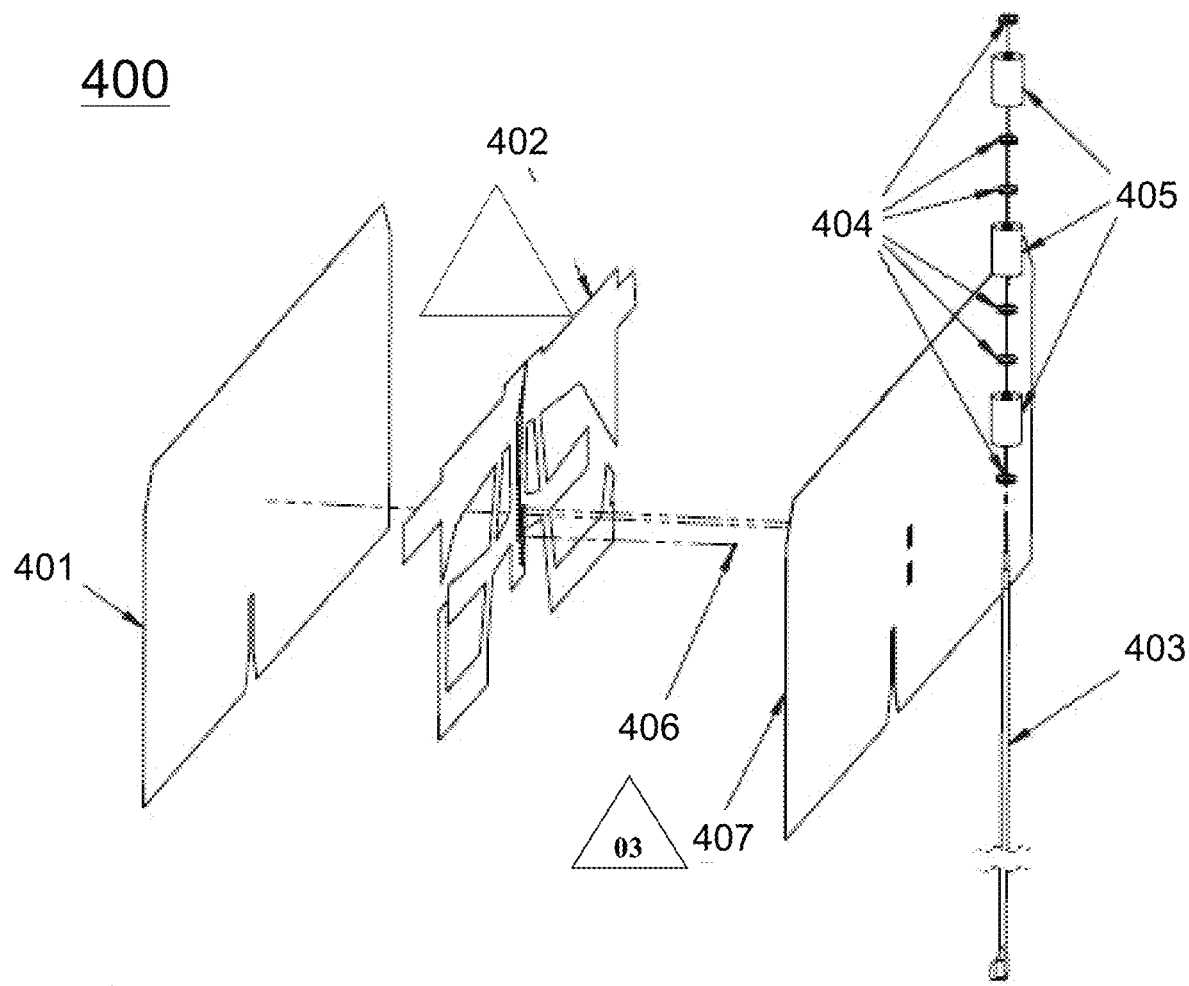
FIG. 4 illustrates first and second substrate layers and copper foil, in accordance with an embodiment of the invention.

In FIG. 4, the layers of the Osprey antenna 400 assembly is disclosed. Specifically, the first substrate layer 401 and the second substrate layer 407 are shown. The first substrate layer 401 provides a surface on which to adhere to the copper antenna elements 402. The second substrate layer 407 protects the antenna elements 402 from abrasion. Furthermore, cable assembly 403, including coaxial with UFL, conducts radio frequency energy between radio and antenna elements 402. The O-Rings 404, e.g., 90A Durometer, hold ferrite cylinders 405 in place on the cable assembly 403. Resister 406, comprising 0402 100 kOhm, allows the system to detect the presence of the properly installed antenna 400.

Those skilled in the art will appreciate the example embodiments are non-exhaustive and that embodiments other than that described here may be included without departing from the scope and spirit of the presently disclosed embodiments.

ADVANTAGES/SUMMARY

Overall, an Osprey antenna is described in several embodiments above. The Osprey antenna includes a first substrate layer. Copper foil antenna elements are configured on the first substrate layer. The second substrate layer is configured over the copper foil. Both the first and second substrate layer are made of flexible material such as Kapton. The antenna elements are composed of the copper foil.

The combined substrate layers and copper foil form an antenna or Osprey antenna that is able to bend/curve into a variety of gas meters and a remote meter adapter. The residential gas meters that the Osprey antenna can fit into include an AC250, Sprague, and Rockwell residential gas meter. The commercial gas meters in which the Osprey antenna can fit into include an AMCO and Rockwell commercial gas meter. The Osprey antenna can also fit into a remote meter adapter.

The antenna elements are composed of the copper foil. The copper foil enables the combined substrate layers and copper foil to function as an antenna that can maintain tunability in at least eight frequency bands. The eight frequency bands can include Cat-M Primary Bands 12, 13, Cat-M Secondary Bands 5, 4, 2, 8 and 26, and an ISM Radio band 902-928 MHz.

When the Osprey antenna is originally positioned in a residential gas meter, the Osprey antenna can be moved form the residential gas meter to one of the commercial gas meters. The Osprey antenna can be bent and curved as needed to fit into the commercial gas meter. The copper foil with the antenna elements enables the Osprey antenna to still maintain tunability in all eight frequency bands. Further, if the Osprey antenna is repositioned from the commercial gas meter to a remote meter adapter, the Osprey antenna will still maintain tunability in all eight frequency bands even if the shape of the Osprey antenna is bent/curved to fit into the remote meter adapter.

In summary, the Osprey antenna is made of flexible material, Kapton, to enable the Osprey antenna to be fit into any one of the residential gas meters, commercial gas meters, and also remote meter adapters. In addition, the copper foil composing the antenna elements enables the Osprey antenna to maintain tunability in all eight frequency bands.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:
a first substrate layer configured at an initial position;
a copper foil positioned above the first substrate layer;
a second substrate layer configured above the copper foil, wherein the second substrate layer combined with the copper foil and first substrate layer is configured to be curved/bent into one or more shapes, and wherein antenna elements are composed of the copper foil; and
a coaxial cable is connected to the copper foil.

2. The system of claim 1, wherein a plurality of ferrite cores are attached to the coaxial cable.

3. The system of claim 1, wherein the combined first substrate layer, copper foil and second substrate layer maintains tunability in at least eight frequency bands.

4. The system of claim 1, wherein the combined first substrate layer, copper foil and second substrate layer is positioned within a remote meter adapter.

5. The system of claim 1, wherein the combined first substrate layer, copper foil and second substrate layer are curved to fit into one or more residential gas meters.

6. The system of claim 1, wherein the antenna elements enables tunability in a Cat-M Primary Band.

7. The system of claim 6, wherein the combined first substrate layer, copper foil, and second substrate and curved to fit into a residential meter and a remote meter adapter.

8. A system comprising:
a plurality of substrate layers configured at an initial position;
a copper foil positioned between the substrate layers, wherein the copper foil combined with the substrate layers is configured to bend/curve into one or more various shapes, wherein the combined substrate layers and copper foil are configured to fit into at least one of a residential gas meter, commercial gas meter, or remote meter adapter; and
copper foil antenna elements positioned on the combined substrate layers to ensure tunability in a plurality of frequency bands.

9. The system of claim 8, wherein the antenna elements enable the tunability in at least eight frequency bands.

10. The system of claim 8, wherein the combined substrate layers and copper foil are curved to be positioned in a Rockwell gas meter.

11. The system of claim 8, the antenna elements maintain tunability in a private LTE Band 8 while the substrate layers and copper foil are bent or curved.

12. The system of claim 8, wherein the combined substrate layers include Polyimide Kapton.

13. The system of claim 8, wherein a coaxial cable is attached to the copper foil positioned between the substrate layers.

14. The system of claim 8, wherein combined substrate layers and copper foil are re-shaped and repositioned from the least one residential gas meter to the at least one remote meter adapter.

15. A method comprising:
configuring a first substrate layer at an initial position;
positioning a copper foil above the first substrate layer;
configuring a second substrate layer configured above the copper foil,
wherein the second substrate layer combined with the copper foil and first substrate layer is configured to be curved/bent into one or more shapes;
positioning copper foil antenna elements; and
positioning a coaxial cable to be connected to the copper foil.

16. The method of claim 15, further comprising:
re-positioning the combined first substrate layer, copper foil, and second substrate layer from a remote meter adapter to a commercial gas meter.

17. The method of claim 15, further comprising:
reshaping the combined first substrate layer, copper foil, and second substrate layer from a commercial gas meter to a residential gas meter.

18. The method of claim 15, further comprising:
curving the combined first substrate layer, copper foil, and second substrate layer to fit into a plurality of residential gas meters at various intervals.

19. The method of claim 15, wherein the antenna elements enable tunability in an ISM Radio band and a plurality of Cat-M Primary Bands.

20. The method of claim 15, further comprising:
curving the combined first substrate layer, copper foil and second substrate layer into a Sprague gas meter.

* * * * *